Feb. 11, 1969   JAMES E. WEBB   3,427,089
ADMINISTRATOR OF THE NATIONAL AERONAUTICS
AND SPACE ADMINISTRATION
ULTRAVIOLET FILTER
Filed March 12, 1965

INVENTOR.
SAMUEL J. HOLMES
BY
Howard B. Scheckman
ATTORNEYS

United States Patent Office 3,427,089
Patented Feb. 11, 1969

3,427,089
ULTRAVIOLET FILTER
James E. Webb, Administrator of the National Aeronautics and Space Administration with respect to an invention of Samuel J. Holmes, North Hollywood, Calif.
Filed Mar. 12, 1965, Ser. No. 439,490
U.S. Cl. 350—1                              6 Claims
Int. Cl. G02b 5/20, 5/28, 13/14

ABSTRACT OF THE DISCLOSURE

A filter of the Fabry-Perot interference type. It will pass a band of ultraviolet radiation in the region of 2,150 angstroms. It has approximately an 80% transmission efficiency, while rejecting sideband radiation of longer and shorter wavelengths. The filter has a base of ultraviolet transparent material, and a filter coating deposited on the base of alternate thin film layers of thorium fluoride and cryolite. The thorium fluoride is used as the high index of refraction material, and the cryolite is used as the low index of refraction material.

Origin of the invention

The invention described herein was made in the performance of work under a NASA contract and is subject to the provisions of Section 305 of the National Aeronautics and Space Act of 1958, Public Law 85–568 (72 Stat. 435; 42 USC 2457).

This invention relates to optical devices and, more particularly, to a coating for an interference type filter that is capable of transmitting a narrow bandwidth of radiation in the ultraviolet region.

Interference type filters, also known as Fabry-Perot type filters, are well known. They normally comprise a base and a coating made up of many layers of thin films applied to the base.

With respect to these coatings, in some cases they may contain as many as forty or more thin film layers. The many thin film layers are selected so as to have alternately high and low indexes of refraction. These films control the reflection and transmission of light in selected regions of the spectrum by causing interferences among light waves generated at the many interfaces. The thin films coact to block passage of unwanted wavelengths on both sides of the selected narrow band of wavelengths that is being transmitted.

A more detailed explanation of filters of this type can be found for example in the magazine, International Science and Technology, April 1962, in the article entitled, "The New Optics," by Harold S. Stewart, page 16; also in U.S. Patent 2,852,980, FIGURE 2, there is shown a filter having a geometry of the interference type.

A filter that will transmit ultraviolet radiation has high utility due to the many uses for ultraviolet radiation. Some of these uses are: in mineral detection, in research—such as mapping the heavens, for fluorescent lighting, and in sterilization of food and medical instruments.

However, one problem in transmitting ultraviolet radiation is that it is rapidly absorbed by most forms of matter, including gases and air. Even ordinary window glass will absorb ultraviolet radiation.

Due to the high absorption of ultraviolet radiation, it has been difficult to construct an efficient filter capable of transmitting selected wavelengths of ultraviolet radiation while filtering out unwanted wavelengths. Most materials suitable for use as a filter coating material absorb the ultraviolet and thus cannot be used, or if they can be used, are very inefficient.

An example of one type of ultraviolet filter presently used is one made with metallic films. However, this type is inefficient in that the metallic films absorb a large part of the ultraviolet radiations. Also, it is difficult and costly to fabricate the metallic films. Conventional coating methods used in the interference filter art, such as vacuum deposition, cannot be used.

This invention teaches making the filter out of alternate layers of thin films of the materials thorium fluoride and cryolite. It has been discovered that these two materials cooperate to provide a very efficient filter for transmission of a band of ultraviolet, while rejecting unwanted side bands. In addition these films can be applied by conventional techniques.

It is therefore an object of this invention to provide a highly efficient filter that will transmit a high percentage of a band of ultraviolet radiation while rejecting unwanted side band radiations.

It is, therefore, an object of this invention to provide a highly efficient filter that will transmit a band of radiation in the region between 2050 to 2250 angstroms.

It is another object of this invention to provide a filter that transmits a narrow band of radiation in the region of 2150 angstroms while rejecting side band radiations of longer and shorter wave lengths.

It is also an object of this invention to provide a highly efficient ultraviolet filter that can be fabricated using standard techniques.

Other objects and advantages will appear from the specification and claims taken in connection with the accompanying sheet of drawing wherein:

Figure 1:
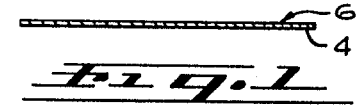
FIGURE 1 is a cross section of a filter showing the coating and base.

Referring to FIGURE 1, there is shown a filter that includes an optical base 4 of quartz or other ultraviolet transparent material, and a filter coating 6 deposited on the base. Coating 6 is made up of a plurality of thin film layers applied on top of each other.

Figure 2:
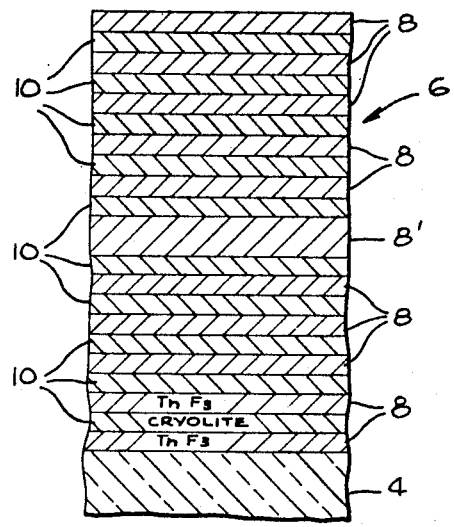
FIGURE 2 is an exploded portion of the cross sectional view of FIGURE 1, to illustrate the various individual thin film layers that make up the coating.

Referring to FIGURE 2, there is shown an exploded view of a portion of the filter in FIGURE 1. The film layers that make up the coating are shown individually. Actually, the thickness of the coating is quite thin and the separate layers can not be distinguished. As an item of interest, in the article "The New Optics," previously cited, it is mentioned that it is practically impossible to analyze the coating formula on a filter. As the article sets forth, "imagine peeling off and analyzing each of forty or so layers a few hundred angstroms thick."

It has been discovered that when a coating is made of alternate thin film layers of thorium fluoride and cryolite [($NaAlF_6$) sodium aluminum fluoride], it has a high ability to pass a band of ultraviolet radiation while blocking adjacent side bands.

At a wavelength of approximately 2150 angstroms, thorium fluoride has an index of refraction of approximately 1.7 and is used as a high index material, while cryolite has an index of refraction of 1.3 and is used as the low index material. These two materials cooperate to transmit the ultraviolet while blocking the side bands.

Referring to FIGURE 2, as is conventional with interference type filters, the coating is made with alternate layers 8, 10 of one-quarter wavelength thickness of material. The thorium fluoride is the first layer applied directly to base 4. Then the cryolite layer is applied in a one-quarter wavelength thickness on top of the layer of thorium fluoride. The thorium fluoride layers 8 and cryolite layers 10 are then alternately applied to form coating 6. In the embodiment disclosed, the layers are applied to form a twenty-one layer sandwich for optimum results, as will be explained later. Also as is conventional with this type filter, the middle layer of thorium fluoride 8[1] is normally made one-half wavelength thick.

It is known to use both thorium fluoride and cryolite in optical filters. However, previously, these two materials have been used as substitutes for one another. They have been used as low index of refraction materials. They have not been used together wherein one provides the high, and one the low index of refraction.

As mentioned previously both cryolite and thorium fluoride are well known in the optical field. Many techniques have been developed for applying these materials. One of the advantages in using these materials over use of metallic films is that conventional vacuum evaporation can be used to apply the individual films.

Figure 3:
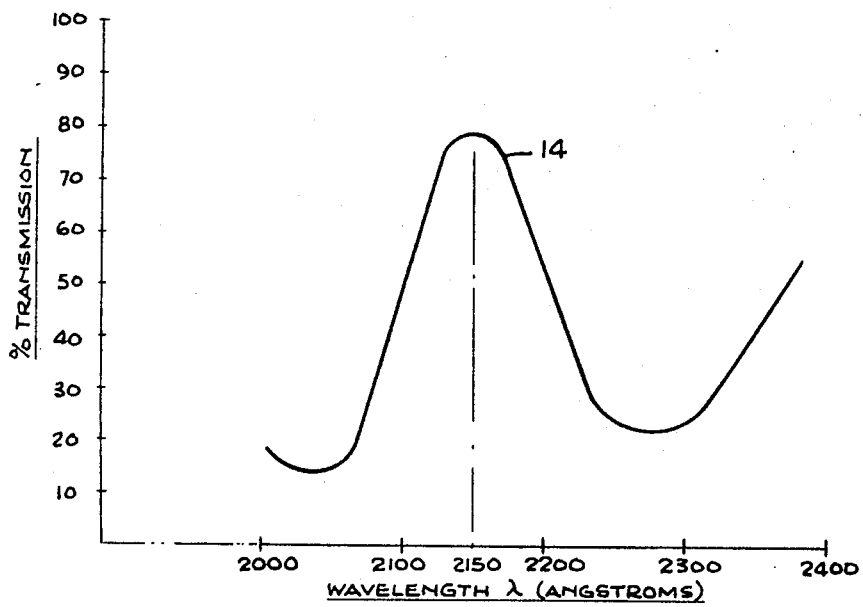
FIGURE 3 is a graph showing the light transmission characteristics of the filter illustrated in FIGURE 1.

Referring to FIGURE 3 there is shown in graph form, the transmission of ultraviolet through the filter. The horizontal scale is wavelength in angstroms, and the vertical scale is in percent of transmission of ultraviolet through the filter.

Curve 14 on the graph indicates that the filter shows an extraordinary transmission of ultraviolet in the 2150 angstrom area. In this area, approximately 80 percent of the ultraviolet is transmitted through the filter. The slopes on both sides of the curve are quite steep. The curve reaches a low at approximately 2050 and 2250 angstroms on each side of the 2150 angstrom line.

The curve indicates that radiation having wavelengths shorter than 2050 angstroms or wavelengths above 2250 angstroms will be rapidly attenuated, and only a small portion will be transmitted by the filter. It will be noted that this filter can be used with other conventional filter techniques to cut out the side band wavelengths as desired.

Although the filter is disclosed as having twenty-one layers, this is a compromise. If more layers are provided there will be an increase in the efficiency of the filter in blocking side band wave lengths. However, this will be at the expense of decreasing the percent of the desired ultraviolet bandwidth transmission. Conversely, if less layers are used, this will increase the percentage of the desired ultraviolet bandwidth transmitted but will also increase the transmission of unwanted sideband wavelengths.

In certain circumstances it is possible to use a coating with as little as five layers. The number of layers will depend on the individual purpose for which the filter is to be used, and for general purposes, twenty-one layers are treated as the optimum amount.

In summary, a filter having an ultraviolet transparent base is provided with a coating made of alternate thin film layers of thorium fluoride and cryolite. The thorium fluoride has a high index of refraction of approximately 1.7 and the cryolite has a low index of refraction of approximately 1.3.

These film layers are each applied in a one-quarter wave length thickness, with the exception of the center film layer being applied one-half wavelength thick. The films are applied until there are twenty-one layers. The resultant filter will transmit a band of radiation between approximately 2150 to 2250 angstroms. There will be about 80 percent transmission of wavelengths of 2150 angstroms while rapidly attenuating the side bands.

Although but a single embodiment of the present invention has been illustrated and described, it will be apparent to one skilled in the art that changes and modifications may be made therein without departing from the invention as defined in the appended claims.

What is claimed:
1. In an interference type filter for transmitting a band of ultraviolet radiation, the improvement comprising:
   a base transparent to ultraviolet radiation; and
   a coating on said base of alternative layers of materials having indexes of refraction of approximately 1.7 1.3 at a wavelength of approximately 2150 angstroms.

2. In an interference type filter for transmitting a band of ultraviolet radiation, the improvement comprising:
   a base transparent to ultraviolet radiation; and
   a coating on said base of alternate layers of thorium fluoride and a material having an index of refraction of approximately 1.3 at a wavelength of approximately 2150 angstroms.

3. In an interference type filter for transmitting a band of ultraviolet radiation, the improvement comprising:
   a base transparent to ultraviolet radiations; and
   a coating on said base of alternate layers of a material having an index of refraction of approximately 1.7 at wavelength of approximately 2150 angstroms and cryolite.

4. In an interference type filter for transmitting a band of ultraviolet radiation, the improvement comprising:
   a base transparent to ultraviolet radiation; and
   a coating on said base of alternate layers of thorium fluoride and cryolite.

5. In an interference type filter for transmitting a band of ultraviolet radiations in approximately the 2150 angstrom wavelength region the improvement comprising:
   a quartz base; and
   a coating on said base of alternating layers of first thorium fluoride and then cryolite to a depth of at least five layers.

6. In an interference filter for transmitting a band of ultraviolet radiation having a wavelength of approximately 2150 angstroms, the improvement comprising:
   a quartz base; and
   a coating on said base of twenty-one layers, the odd numbered layers being of thorium fluoride having an index of refraction of approximately 1.7, and the even numbered layers being cryolite, having an index of refraction of approximately 1.3; said filter having a short wavelength cut-off at approximately 2050 angstroms, a long wavelength cut-off at approximately 2250 angstroms, and transmitting approximately 80 percent of the ultraviolet at wavelengths of approximately 2150 angstroms.

References Cited

UNITED STATES PATENTS 3,015,253   1/1962   Foreman et al.
3,200,253   8/1965   Geier.

OTHER REFERENCES

Schroeder, "Interference Transmission Filters for the Far Ultraviolet" J.O.S.A., volume 52, pp. 1380–1386 (December 1962).

Smakula, Kalnajs, and Redman, "Optical Materials and Their Preparation" Applied Optics, volume 3, pp. 323–328 (March 1964).

DAVID SCHONBERG, *Primary Examiner.*

PAUL R. MILLER, *Assistant Examiner.*

U.S. Cl. X.R.

350—166